(12) United States Patent
Islam et al.

(10) Patent No.: US 12,732,075 B2
(45) Date of Patent: Sep. 8, 2026

(54) HIGH-POWER MULTIPHASE ELECTRIC MACHINE WITH REDUCED MUTUAL INDUCTANCE INTERACTION

(71) Applicant: Cummins Inc., Columbus, IN (US)

(72) Inventors: Md Khurshedul Islam, Starkville, MS (US); Akm Arafat, Blaine, MN (US)

(73) Assignee: Cummins Inc., Columbus, IN (US)

( * ) Notice: Subject to any disclaimer, the term of this patent is extended or adjusted under 35 U.S.C. 154(b) by 245 days.

(21) Appl. No.: 18/274,561

(22) PCT Filed: Jan. 14, 2022

(86) PCT No.: PCT/US2022/012413

§ 371 (c)(1),
(2) Date: Jul. 27, 2023

(87) PCT Pub. No.: WO2022/173551

PCT Pub. Date: Aug. 18, 2022

(65) Prior Publication Data

US 2024/0128844 A1 Apr. 18, 2024

Related U.S. Application Data

(60) Provisional application No. 63/148,716, filed on Feb. 12, 2021.

(51) Int. Cl.
*H02K 21/16* (2006.01)
*H02K 1/276* (2022.01)
*H02K 3/28* (2006.01)

(52) U.S. Cl.
CPC ............. *H02K 21/16* (2013.01); *H02K 1/276* (2013.01); *H02K 3/28* (2013.01); *H02K 2201/06* (2013.01)

(58) Field of Classification Search
CPC ...... H02K 1/276; H02K 1/2766; H02K 21/16; H02K 2201/06; H02K 2213/03; H02K 3/28
(Continued)

(56) References Cited

U.S. PATENT DOCUMENTS 4,338,534 A 7/1982 Broadway et al.
4,672,251 A * 6/1987 Broadway .............. H02K 17/14 318/773
(Continued)

FOREIGN PATENT DOCUMENTS

CN 101986514 B 3/2011
CN 201877917 U 6/2011
(Continued)

OTHER PUBLICATIONS

Translation of foreign document JP 2017158379 A (Year: 2017).*
(Continued)

*Primary Examiner* — Alex W Mok
(74) *Attorney, Agent, or Firm* — Brooks Kushman P.C.

(57) ABSTRACT

Six-phase permanent magnet-type electric machines are disclosed. The electric machine includes a stator and a rotor configured to operate as a first three-phase electric machine and a second three-phase electric machine. The first and second three-phase electric machines are coupled with each other via a fractional slot combination with concentrated windings such that a mechanical separation between the first and second three-phase electric machines is at least 60 mechanical degrees.

19 Claims, 6 Drawing Sheets

(58) Field of Classification Search
USPC .................................................... 310/156.47
See application file for complete search history.

(56) References Cited

U.S. PATENT DOCUMENTS 4,914,335 A * 4/1990 Horton .................... H02K 3/50 310/71
4,954,740 A * 9/1990 Brigham ................. H02K 3/28 318/773
5,455,500 A * 10/1995 Shichijyo ................ H02K 3/28 310/198
5,929,579 A * 7/1999 Hsu ....................... H02K 13/14 318/541
8,487,499 B2 * 7/2013 Tanaka .................... H02K 3/28 310/179
8,653,797 B2 * 2/2014 Cullen .................... H02K 3/28 318/700
8,823,236 B2 * 9/2014 Ishikawa ................. H02K 3/28 310/198
9,985,507 B2 * 5/2018 Nakano ............... B62D 5/0481
10,454,329 B2 * 10/2019 Schweinert ........... H02K 9/193
10,840,832 B2 * 11/2020 Akutsu ................. H02K 1/278
10,886,807 B2 * 1/2021 Horizumi ................ H02K 3/50
2010/0289372 A1 11/2010 Taniguchi
2014/0009093 A1 1/2014 Suzuki
2014/0346910 A1 * 11/2014 Nakano ................... H02K 3/28 310/156.01
2015/0270747 A1 * 9/2015 Toliyat .................. H02K 5/132 310/156.01
2015/0357892 A1 * 12/2015 Nakano ................... H02K 3/12 180/443
2017/0264176 A1 * 9/2017 Bernot .................. H02K 1/145
2017/0366115 A1 12/2017 Akutsu et al.
2018/0091007 A1 * 3/2018 Saito ....................... H02K 3/20
2018/0342914 A1 * 11/2018 Saito .................... B60L 15/007
2019/0181786 A1 6/2019 Singh et al.
2023/0127155 A1 * 4/2023 Ito .......................... H02K 1/16 310/208

FOREIGN PATENT DOCUMENTS

CN 201975885 U 9/2011
JP 2017158379 A * 9/2017

OTHER PUBLICATIONS

International Search Report and Written Opinion for International patent application No. PCT/US2022/012413, filed Jan. 14, 2022, mailed Apr. 11, 2022.
International Preliminary Report on Patentability received for PCT Patent Application No. PCT/US2022/012413, mailed on Aug. 24, 2023, 11 pages.

* cited by examiner 100
204
200
202
S1
S2
S3
S4
S5
S6
S7
S8
S9
S10
S11
S12
A1
A2
B1
B2
C1
C2
V
+
-

Magnet Eddy Loss

Magnet Eddy Loss (W)

200
150
100
50
0

No segment
2 segments
3 segments

Core Loss

Core Loss (W)

4000
3000
2000
1000
0

No segment
2 segments
3 segments

HIGH-POWER MULTIPHASE ELECTRIC MACHINE WITH REDUCED MUTUAL INDUCTANCE INTERACTION

CROSS-REFERENCE TO RELATED APPLICATIONS

The present application claims the benefit of priority to International Patent Application No. PCT/US2022/012413, filed Jan. 14, 2022, which claims the benefit of priority to U.S. Provisional Patent Application No. 63/148,716, filed Feb. 12, 2021, the contents of which are incorporated herein by reference in their entirety.

FIELD OF THE DISCLOSURE

The present disclosure relates generally to electric machines and more specifically to multiphase electric machines for medium-duty and heavy-duty applications.

BACKGROUND OF THE DISCLOSURE

Electric machines, or more specifically permanent magnet machines such as motors and generators, use two coils of wire brought into close proximity with each other so as to link the magnetic field from one coil to another magnetic field from the other coil, generating voltage in the second coil as a result. This is called mutual interaction, i.e. when voltage impressed upon one coil induces a voltage in another. This may be problematic in a six-phase machine due to the interference that can result from the mutual inductance interaction, especially one that is unintentional and unwanted. Accordingly, further contributions are needed in this area of technology to reduce such mutual inductance interaction without sacrificing fundamental performance of the electric machines.

SUMMARY OF THE DISCLOSURE

According to the present disclosure, a six-phase electric machine includes a stator and a rotor configured to operate as a first three-phase electric machine and a second three-phase electric machine. The first and second three-phase electric machines are coupled with each other via a fractional slot combination with concentrated windings. A mechanical separation between the first and second three-phase electric machines is at least 60 mechanical degrees.

In some examples, the mechanical separation is at least 75 mechanical degrees. In some examples, the six-phase electric machine has a 10-pole configuration such that an electrical separation between phases of the first and second three-phase electric machines is about 15 electrical degrees. In some examples, the six-phase electric machine has a winding factor of at least 95% and a slot harmonic distortion of less than 50%. In some examples, the rotor includes a plurality of V-shaped magnets. The number of V-shaped magnets equal a number of poles in the six-phase electric machine. Each leg of the V-shaped magnets includes at least two separate segments of magnet.

In some examples, the V-shaped magnets are positioned in an axially segmented and skewed orientation with respect to each other. In some examples, a torque ripple resulting from an open fault of one of the first and second three-phase electric machines is less than 20%. In some examples, the six-phase electric machine is a medium duty motor with a power rating of between about 150 kW and 250 kW. In some examples, the six-phase electric machine is a heavy duty motor with a power rating of at least about 250 kW. In some examples, the power rating of the heavy duty motor is between about 250 kW and 500 kW. The first and second three-phase electric machines may share a common neutral.

Additional features and advantages of the present disclosure will become apparent to those skilled in the art upon consideration of the following detailed description of the illustrative embodiment exemplifying the best mode of carrying out the disclosure as presently perceived.

BRIEF DESCRIPTION OF THE DRAWINGS

The detailed description of drawings particularly refers to the accompanying figures in which:

FIGS. 4A and 4B are cross-sectional views of a segmented magnet of the electric machine according to embodiments disclosed herein;

DETAILED DESCRIPTION

The embodiments of the disclosure described herein are not intended to be exhaustive or to limit the disclosure to the precise forms disclosed. Rather, the embodiments selected for description have been chosen to enable one skilled in the art to practice the disclosure.

With respect to terminology of inexactitude, the terms "about" and "approximately" may be used, interchangeably, to refer to a measurement that includes the stated measurement and that also includes any measurements that are reasonably close to the stated measurement. Measurements that are reasonably close to the stated measurement deviate from the stated measurement by a reasonably small amount as understood and readily ascertained by individuals having ordinary skill in the relevant arts. Such deviations may be attributable to measurement error or minor adjustments made to optimize performance, for example.

Figure 1:
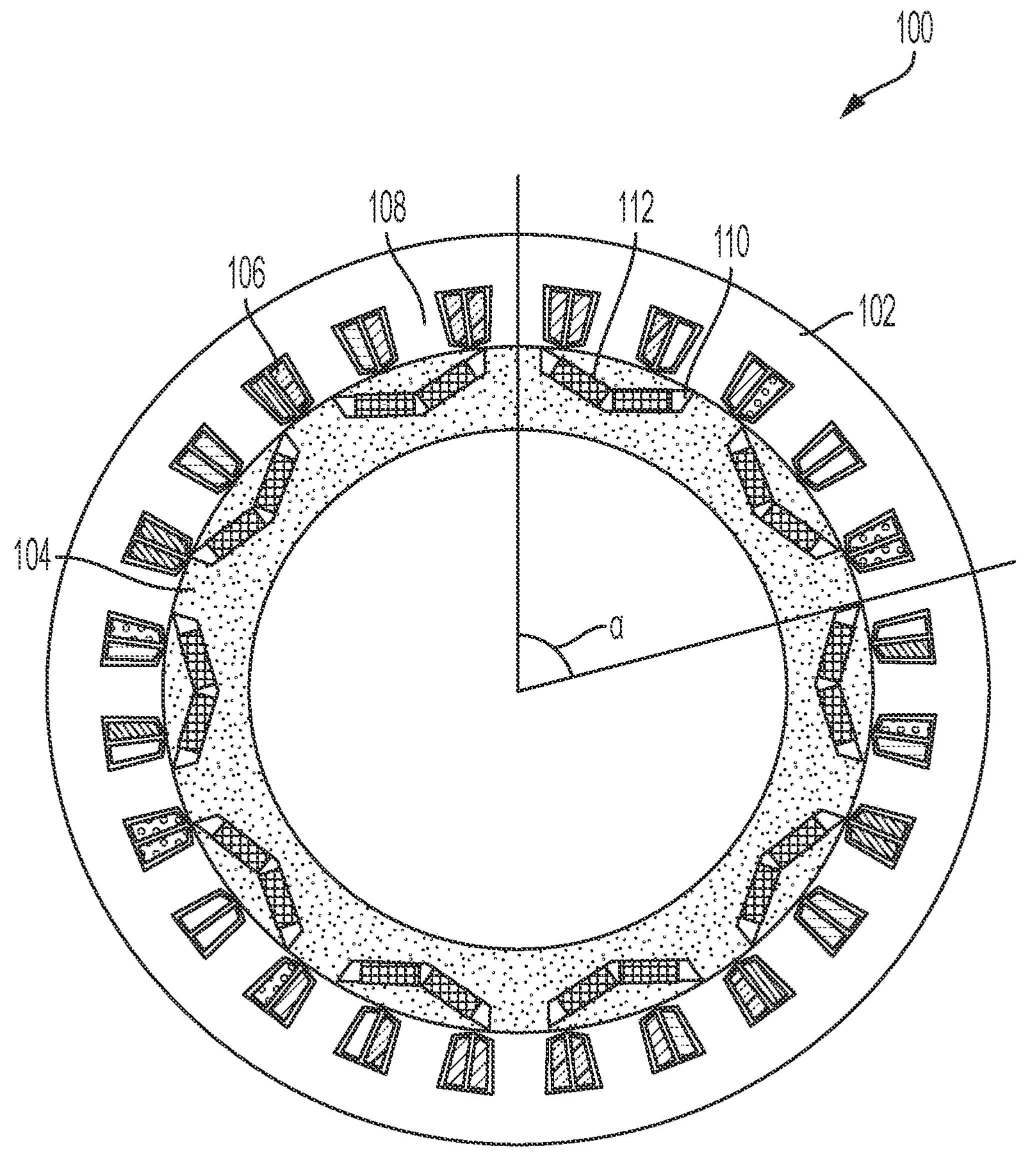
FIG. 1 is a cross-sectional view of an electric machine according to an embodiment disclosed herein.

FIG. 1 shows a cross-sectional view of an example of a permanent magnet-type rotating electric machine 100 such as a motor or generator according to embodiments disclosed herein. The electric machine 100 includes a stator 102 and a rotor 104 arranged for rotation relative to each other. The rotor 104 is driven by an energy source such as a battery (labeled with "V" in FIG. 2), often mounted on the shaft of the engine, motor, or turbine, for example. The electric machine 100 may be implemented in an electric vehicle or a hybrid vehicle, for example.

The stator 102 includes a plurality of stator slots 106 between a plurality of stator teeth 108, where each stator slot 106 holds two different and separate winding phases in a double-layer arrangement. The rotor 104 includes a plurality of rotor slots 110 in which permanent magnets 112 are inserted. The rotor 104 generates a magnetic field using the permanent magnets 112 that interact with the windings maintained on the stator 102. As the magnetic field intercepts the windings, an electrical current is generated. Although the rotor 104 is shown to be inside the stator 102, if the electric machine 100 is an outer rotor design, the rotor 104 may surround the stator 102.

In the example as shown, the electric machine 100 implements tooth-wound fractional slot concentrated windings (FSCW) which reduces the total volume of the electric machine and the end winding length, resulting in losses compared to a distributed winding machine. The electric machine 100 has 24 slots and 10 poles, although other numbers of slots and poles may be implemented.

Figure 2:
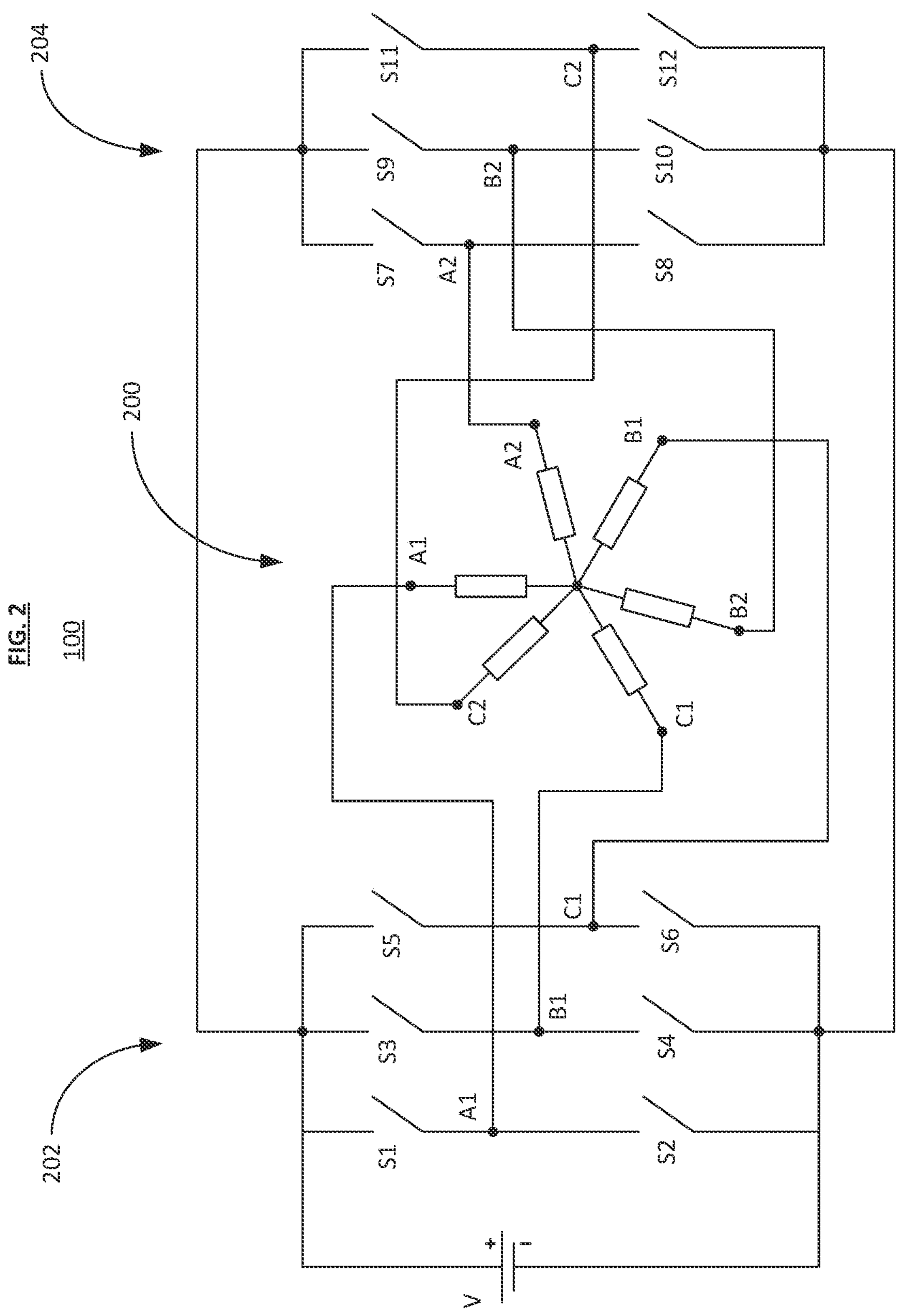
FIG. 2 is a schematic diagram of the inverters implemented in the electric machine according to an embodiment disclosed herein.

FIG. 2 illustrates a schematic diagram of an example of the electric machine 100 as disclosed herein. The machine 100 is a six-phase AC electric machine 200 such as a six-phase permanent magnet motor made by combining two (2) three-phase AC electric machines. A first three-phase electric machine uses a three-phase inverter 202 implemented via six (6) switches S1 through S6, and a second three-phase electric machine uses another three-phase inverter 204 implemented via six (6) switches S7 through S12. The inverters 202 and 204 act as a six-phase inverter. The control signal for each of the switches S1 through S12 is provided by a controller (e.g., motor controller 702 in FIG. 7) electrically coupled with the electric machine 100.

The first three-phase electric machine includes three phases governed by coil windings A1, B1, and C1, and the second three-phase electric machine includes three phases governed by coil windings A2, B2, and C2. Switches S1 and S2 control electrical current flowing through coil winding A1, switches S3 and S4 control electrical current flowing through coil winding B1, and switches S5 and S6 control electrical current flowing through coil winding C1 of the first three-phase electric machine. Likewise, switches S7 and S8 control electrical current flowing through coil winding A2, switches S9 and S10 control electrical current flowing through coil winding B2, and switches S11 and S12 control electrical current flowing through coil winding C2. Each of the three-phase electric machines implements star windings, causing the six-phase electric machine 200 to assume a double-star winding.

Figure 3:
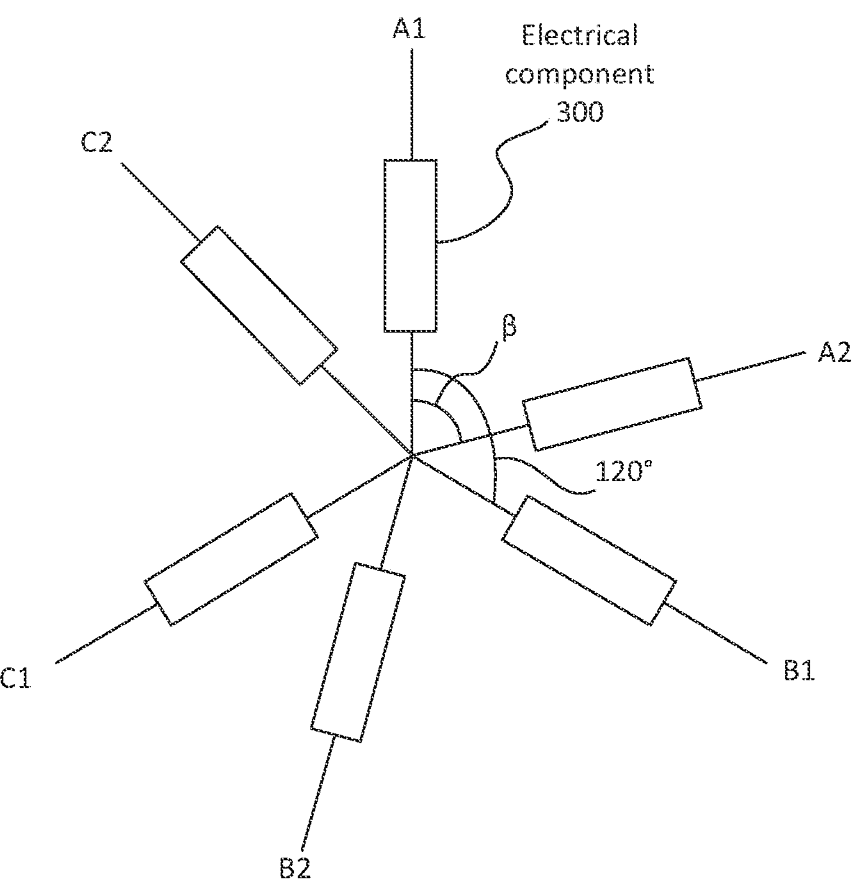
FIG. 3 is an enlarged view of a six-phase electric machine as shown in FIG. 2.

FIG. 3 shows an enlarged view of the six-phase electric machine 200 from FIG. 2. The coil windings A1, B1, and C1 of the first three-phase electric machine and the coil windings A2, B2, and C2 of the second three-phase electric machine may each have a certain amount of resistance and impedance, as represented by an electrical component 300. Both of the three-phase electric machines utilize a wye configuration which connects each winding to a common neutral point. Each of the three electrical phases of the first star winding, namely A1, B1 and C1, has a 120-degree separation from the other electrical phases of the first star winding, and each of the three electrical phases of the second star winding, namely A2, B2 and C2, has a 120-degree separation from the other electrical phases of the second star winding. In some examples, the two three-phase electric machines may share a common neutral point. In other examples, the two three-phase electric machines may have different common neutral points from each other.

The two three-phase electric machines are moved with respect to each other by an offset angle β (in electrical degrees), such that the electrical phase of the coil winding A1 has a separation of β electrical degrees from the electrical phase of the coil winding A2, the electrical phase of the coil winding B1 has a separation of β electrical degrees from the electrical phase of the coil winding B2, and the electrical phase of the coil winding C1 has a separation of β electrical degrees from the electrical phase of the coil winding C2. The offset angle β is referred to as an electrical separation angle. The electrical separation angle can be converted to a mechanical separation (shift) angle α, as shown in FIG. 1, with the following formula:

$$\beta = (\alpha) \times (\text{number of poles})/2 \quad \text{(Equation 1)}$$

In the six-phase electric machine 200 as disclosed herein, the two three-phase electric machines are operatively coupled with each other via a fractional slot combination with concentrated windings, thus forming the FSCW, and the two three-phase electric machines have a mechanical separation α of at least 60 mechanical degrees with respect to each other. In some examples, the mechanical separation α may be at least 65 mechanical degrees, at least 70 mechanical degrees, at least 75 mechanical degrees, or any other range therebetween.

When the coil windings of the two three-phase electric machines have a mechanical separation α of 75 mechanical degrees in a six-phase electric machine having 10 poles, the equivalent electrical separation is 375 electrical degrees (which equals 15 electrical degrees) as the offset angle β. Any other suitable values for offset angle β may be implemented based on the different degrees of mechanical separation α. According to experimental data, the offset angle β of 15 electrical degrees in a 10-pole six-phase electric machine facilitates reducing a total harmonic distortion of the slots to less than about 50% and increasing a winding factor (which is defined as the product of a distribution factor and a coil span factor) to at least about 80%. In some examples, the total harmonic distortion may be less than about 47%, less than about 45% or less than about 42%. In some examples, the winding factor may be at least about 85%, at least about 90%, or at least about 95%.

Furthermore, a torque ripple (difference in maximum and minimum torque over one complete revolution of the rotor) resulting from an open fault of one of the first and second three-phase electric machines may be less than about 20%. In some examples, the torque ripple may be less than about 15%, less than about 10%, or any value therebetween.

FIGS. 4A and 4B illustrate examples of different magnet configurations as implemented in the rotor 104. FIG. 4A illustrates one example of the magnet 112 implemented within the slot 110. The magnet 112 is implemented as a V-shape magnet having legs 402 and 404, each leg separated into two (2) segments by a radial segmentation or separation 400, forming a total of four (4) segments of magnet. The separation 400 may be implemented by physically separating the segments apart such that there is an airgap between the segments. The segmentation facilitates reduction of the surface current.

In some examples, the separation 400 may include very thin air space or adhesive polymer such as glue to keep the magnets attached. The separation 400 according to some examples may be less than about 1 mm, less than about 0.5 mm, or less than 0.3 mm, or any other range therebetween. FIG. 4B illustrates another example of the magnet 112, which is V-shaped and whose legs 402 and 404 are each separated into three (3) segments by the separations 400, forming a total of six (6) segments of magnet.

Figure 5:
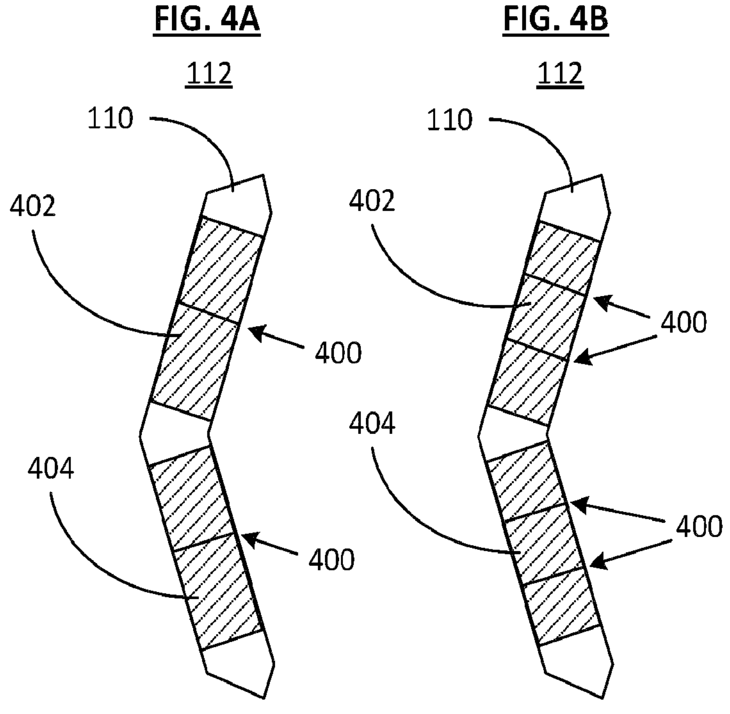
FIG. 5 are graphs comparing the magnet eddy loss and core loss of the unsegmented magnet and segmented magnet according to embodiments disclosed herein.

FIG. 5 shows two charts comparing an eddy current loss (loss of energy due to eddy currents) in the magnet and a core loss (the loss that occurs in a magnetic core due to alternating magnetization, which is the sum of the hysteresis loss and the eddy current loss) as experimentally obtained based on the different segmentations of the magnets. As shown, when compared to no segmentation (eddy loss of about 180 W), the two-segment example shown in FIG. 4A shows less than half of the eddy loss (about 70 W) experienced by the unsegmented example, and the three-segment example shown in FIG. 4B shows less than one-fourth of the eddy loss (about 40 W) experienced by the unsegmented example. The total core loss remains approximately the same for all three examples, at about 3.4 kW.

Figure 6:
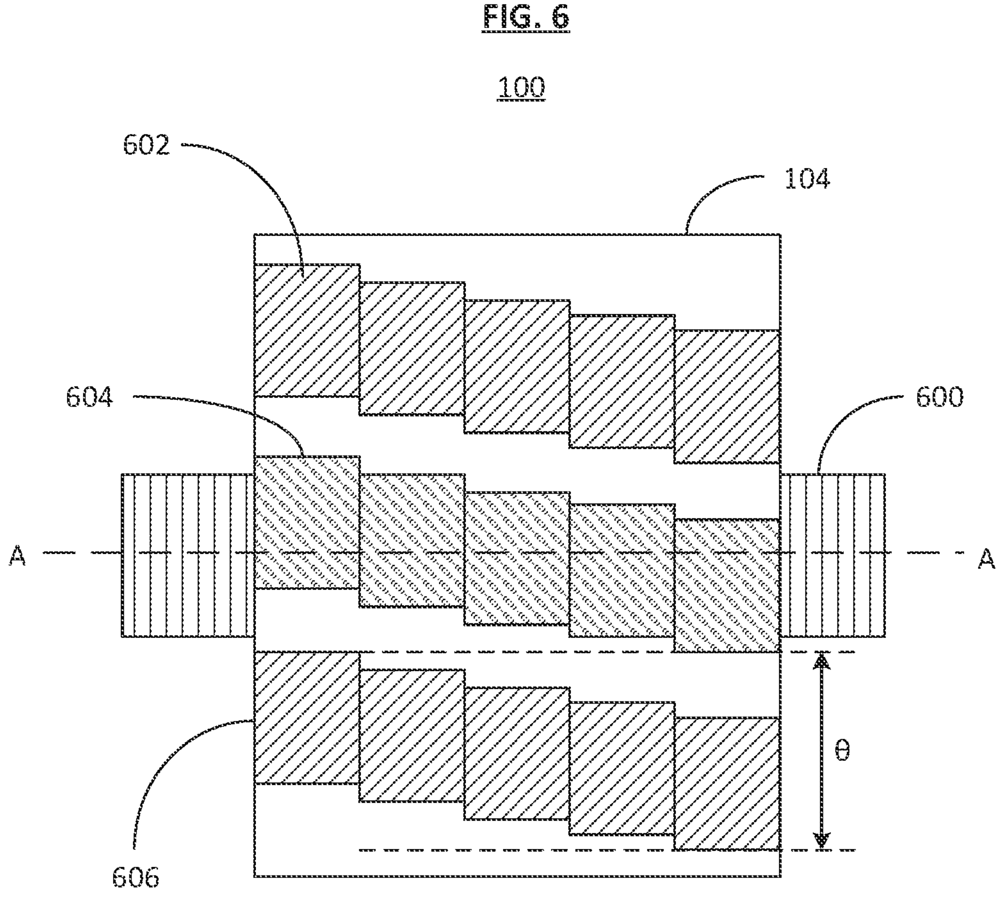
FIG. 6 is a side view of a rotor of the electric machine according to embodiments disclosed herein.

FIG. 6 illustrates an example of the electric machine 100 of FIG. 1 as seen from the side according to embodiments disclosed herein. The electric machine 100 in this example has the rotor 104 disposed within the stator 102, as such the rotor 104 has a shaft 600 extending therethrough and defining a longitudinal axis (A-A) of the rotor 104. Magnets 602, 604, and 606 are aligned proximate an exterior of the rotor 104 to be positioned proximate the stator 102 when implemented together.

The magnets 602, 604, and 606 are axially segmented so as to form a skewed orientation (also referred to as a stepped or staggered orientation) with respect to the longitudinal axis, as shown. The magnets are shown to be segmented into 5 segments, but any other suitable number of segments may be implemented to attain higher or lower torque. A skew angle θ (in electrical degree) may be any suitable value that is experimentally obtained. In the example shown, the skew angle θ is 25 electrical degrees for the 5-segment implementation.

The six-phase electric machine 200 as implemented herein may pertain to a medium-duty or a heavy-duty electric machine. A medium-duty electric machine may have a power rating of between about 150 kW and about 250 kW, whereas a heavy-duty electric machine may have a power rating of greater than about 250 kW. In some examples, the heavy-duty electric machine may have a power rating of at least 400 kW, 450 kW, or 500 kW, for example. In some examples, the heavy-duty machine may have the power rating of between about 250 kW and about 500 kW.

Advantages of implementing a six-phase electric machine with FSCW such that the two three-phase electric machines have a mechanical separation of at least 60 mechanical degrees include reduction in the mutual inductance interaction between the different windings. Experimental results indicate that, for a 24-slot and 10-pole implementation with the FSCW winding and the mechanical separation of 75 mechanical degrees and segmented and axially skewed V-shaped magnets, the mutual inductance interaction is reduced to about 26%, as compared to about 94% mutual inductance interaction for a conventional implementation of a 72-slot and 12-pole implementation with distributed winding and a mechanical separation of 5 mechanical degrees with no magnet separation and no axial skewing. The former implementation also has a better fault tolerant capability than the latter. Furthermore, as compared to a conventional 12-slot and 10-pole electric machine implementation with none of the aforementioned features as disclosed herein, the six-phase electric machine as disclosed herein has less noise, vibration, and harshness issues due to the reduction in airborne harmonics (e.g., airborne noise).

Figure 7:
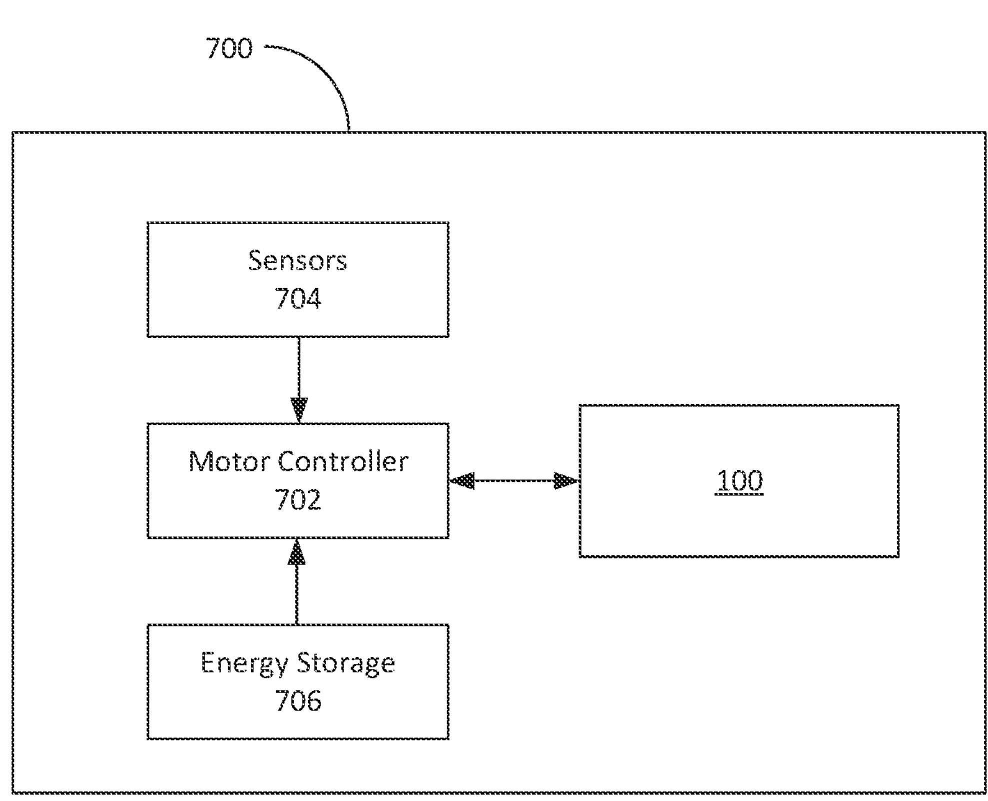
FIG. 7 is a schematic diagram of a vehicle implementing the electric machine according to an embodiment disclosed herein.

FIG. 7 illustrates a vehicle 700 in which the electric machine 100, which is a motor, is configured to be installed, according to some examples. The vehicle may be a fully electric vehicle or a hybrid vehicle (in which case the vehicle would include additional components such as engine, which are not shown for simplicity). The motor may also operate as a generator (e.g., provide a regeneration function) during one or more operating conditions of the vehicle. The vehicle 700 further includes a motor controller 702, at least one sensor 704 for detecting conditions of the vehicle and/or its surroundings, and at least one energy storage device 706 which may include a battery/batteries, a battery pack, capacitor(s), or any other suitable type of energy storage device, for example.

The motor controller 702 is a motor control module which may receive one or more vehicle inputs such as brake, clutch, vehicle speed, rotational speed, temperature, etc., from various sensors, circuits and/or other components of the vehicle. As such, the sensors 704 may be configured to provide such information and data to the motor controller 702. As previously explained, the control signal for each of the switches S1 through S12 is provided by the motor controller 702 coupled with the motor. As previously explained, the energy storage device 706 may be implemented as the energy source to drive the rotor of the electric machine 100.

The motor controller 254 includes one or more processors and at least one memory unit. The memory unit may include one or more modules such as software modules and may be a non-transitory computer-readable storage medium which stores thereon instructions such as codes which can be run by the processor(s) to perform certain tasks. For example, the modules or instructions stored in the memory unit may include any suitable module/instructions for generating one or more control signals to control the operation of the motor. In some examples, the motor is the six-phase AC electric machine such as a six-phase permanent magnet motor made by combining two (2) three-phase AC electric machines, in which case the module may be configured to generate control signals to control the operation of each of the three-phase AC electric machines, as previously explained. In some examples, the modules or instructions stored in the memory unit may also include any suitable module/instructions for providing the regeneration function to deliver electrical charge to the energy storage device 706.

Although the examples and embodiments have been described in detail with reference to certain preferred embodiments, variations and modifications exist within the spirit and scope of the disclosure as described and defined in the following claims.

What is claimed is:

1. A six-phase electric machine comprising:

a stator and a rotor configured to operate as a first three-phase electric machine and a second three-phase electric machine, the first and second three-phase electric machines coupled with each other via a fractional slot combination with concentrated windings, the rotor comprising a plurality of V-shaped magnets, the number of V-shaped magnets equal to a number of poles in the six-phase electric machine, wherein each of the V-shaped magnets includes five (5) axially segmented components that are in a skewed orientation with respect to each other, wherein the skewed orientation defines a skew angle of 25 electrical degrees.

2. The six-phase electric machine of claim 1, the six-phase electric machine having a 10-pole configuration.

3. The six-phase electric machine of claim 1, wherein the six-phase electric machine has a winding factor of at least 95% and a slot harmonic distortion of less than 50%.

4. The six-phase electric machine of claim 1, wherein each leg of the V-shaped magnets comprises at least two separate segments of magnet.

5. The six-phase electric machine of claim 1, wherein a torque ripple resulting from an open fault of one of the first and second three-phase electric machines is less than 20%.

6. The six-phase electric machine of claim 1, wherein the six-phase electric machine is a medium duty motor with a power rating of between about 150 kW and 250 kW.

7. The six-phase electric machine of claim 1, wherein the six-phase electric machine is a heavy duty motor with a power rating of at least about 250 kW.

8. The six-phase electric machine of claim 7, wherein the power rating of the heavy duty motor is between about 250 kW and about 500 kW.

9. The six-phase electric machine of claim 1, wherein the first and second three-phase electric machines share a common neutral.

10. The six-phase electric machine of claim 1, wherein an electrical separation between the first and second three-phase electric machines is 15 electrical degrees.

11. A vehicle comprising:

a motor controller; and a six-phase electric motor electrically coupled with the motor controller and comprising:

a stator and a rotor configured to operate, by the motor controller, as a first three-phase electric motor and a second three-phase electric motor, the first and second three-phase electric motors coupled with each other via a fractional slot combination with concentrated windings, the rotor comprising a plurality of V-shaped magnets, the number of V-shaped magnets equal to a number of poles in the six-phase electric motor, wherein each of the V-shaped magnets includes five (5) axially segmented components that are in a skewed orientation with respect to each other, wherein the skewed orientation defines a skew angle of 25 electrical degrees.

12. The vehicle of claim 11, the six phase electric motor having a 10-pole configuration.

13. The vehicle of claim 11, wherein the six-phase electric motor has a winding factor of at least 95% and a slot harmonic distortion of less than 50%.

14. The vehicle of claim 11, wherein each leg of the V-shaped magnets comprises at least two separate segments of magnet.

15. The vehicle of claim 11, wherein a torque ripple resulting from an open fault of one of the first and second three-phase electric motors is less than 20%.

16. The vehicle of claim 11, wherein the six-phase electric motor is a medium duty motor with a power rating of between about 150 kW and 250 kW.

17. The vehicle of claim 11, wherein the six-phase electric motor is a heavy duty motor with a power rating of at least about 250 kW.

18. The vehicle of claim 11, wherein an electrical separation between the first and second three-phase electric motors is 15 electrical degrees.

19. A six-phase electric machine comprising:

a stator and a rotor configured to operate as a first three-phase electric machine and a second three-phase electric machine, the first and second three-phase electric machines coupled with each other via a fractional slot combination with concentrated windings, wherein an electrical separation between the first and second three-phase electric machines is 15 electrical degrees, wherein the rotor includes a plurality of V-shaped magnets, the number of V-shaped magnets is equal to a number of poles in the six-phase electric machine, and each of the V-shaped magnets includes five (5) axially segmented components that are in a skewed orientation with respect to each other, wherein the skewed orientation defines a skew angle of 25 electrical degrees, and wherein having the electrical separation of 15 electrical degrees facilitates a winding factor of at least 80% and a slot harmonic distortion of less than 50% for the six-phase electric machine.

* * * * *